Nov. 26, 1957 B. V. VONDERSCHMITT ET AL 2,814,758
RASTER CENTERING CIRCUIT ARRANGEMENT
Filed Oct. 25, 1954
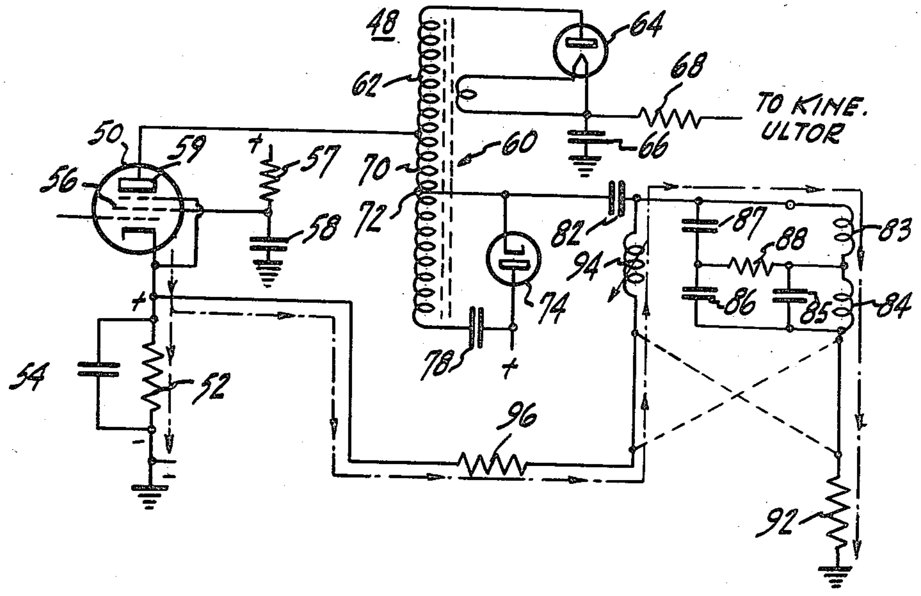
INVENTORS
BERNARD V. VONDERSCHMITT
& DEWAYNE K. GUHN
[signature]
ATTORNEY United States Patent Office 2,814,758

Patented Nov. 26, 1957

2,814,758

RASTER CENTERING CIRCUIT ARRANGEMENT

Bernard V. Vonderschmitt, Merchantville, and Dewayne K. Guhn, Haddonfield, N. J., assignors to Radio Corporation of America, a corporation of Delaware Application October 25, 1954, Serial No. 464,270

5 Claims. (Cl. 315—27)

The invention relates to deflection systems for television receivers, and it particularly pertains to horizontal deflection circuit arrangements for centering the raster produced by an electron beam.

In present television practice an image is reproduced on the fluorescent screen of the cathode ray tube, or kinescope, by an electron beam which is deflected to trace sucessive lines forming a raster on the screen. Deflection of the electron beam may be accomplished magnetically or electrostatically. In the magnetic deflection system a sawtooth wave of current is applied to the windings of a deflection system which are mounted in a yoke arranged about the neck of the kinescope. Sawtooth deflection waves are generated by appropriate circuits in the television receiver, part of which are a power amplifier device, an output transformer, and the deflection system windings.

In television receivers where no component is provided to adjust the linearity of the horizontal deflection, the center of the raster is nearer to the left side of the screen because of an inherent stretch of the left side of the reproduced image and compression of the right. In present day television receivers using electrostatic focus kinescopes, centering may be accomplished by using a centering magnet located immediately to the rear of the deflection system windings. Likewise, with magnetically focused kinescopes, centering may be accomplished by movement of the focused magnet or a portion thereof. In large kinescopes having a wide angle of deflection, the beam centering function must be performed at a location on the neck of the kinescope nearer to the flared portion to prevent "neck shadow." Neck shadow is the mechanical interference with the beam by the neck of the kinescope at the corners or sides of the scanning raster.

Centering of the raster may be accomplished by controlled flow of direct current in the defletion system windings. It is desirable to permit direct current for centering flow through the deflection system windings in either direction as dictated by the centering requirements but not through the output transformer.

An object of the invention is to provide improved means for introducing centering current in the deflection system windings.

Another object of the invention is to provide a circuit arrangement for obtaining centering current from the normal anode-cathode circuit current flow and thereby eliminate the necessity for a separate direct current source.

The objects of the invention are obtained in a horizontal deflection circuit arrangement for a television receiver having a deflection system including a winding traversed by direct current obtained from a normal source of direct biasing potential. According to the invention, the deflection system winding is effectively connected across a deflection wave winding of an output transformer for the A.-C. component while the deflection system winding and a width controlling inductor are connected in series across the cathode bias resistor of the amplifying tube for D.-C. centering current flow. A resistive component is interposed in the series circuit to limit the current flow to the desired value. In practice the resistance value of this resistive component is preferably adjusted initially at the factory to provide a nominal centering current which is within the approved manufacturing tolerances of the kinescopes to be used with the television receiver under consideration.

In order that the invention may be more clearly understood and readily put to practical use, a specific embodiment of the invention, given by way of example only, is described below with reference to the accompanying drawing forming a part of the specification in which the sole figure is a schematic diagram of a horizontal deflection circuit arrangement according to the invention.

In the sole figure there is shown a schematic diagram of a deflection wave and high voltage generating circuit arrangement for use with a television receiver otherwise comprising circuits which may be entirely conventional and which will be described to illustrate the setting of the invention. In such a receiver television signals appearing at an antenna are applied to a radio frequency wave amplifying circuit and the output therefrom is applied along with a wave obtained from a local beat oscillation generating circuit through a frequency changing circuit. The output of the frequency changing circuit is applied to an intermediate frequency amplifier, which may be an individual picture intermediate frequency amplifying circuit or one amplifying both picture and sound intermediate frequency signals. A demodulating circuit is coupled to the I.-F. amplifier for deriving a video wave from the television signals. The detected video signals are amplified in a video frequency amplifying circuit and thereafter applied to the input circuit of an image reproducing device, or kinescope. Sound signals are derived from the frequency changing circuit, or from the I.-F. amplifying circuit, or from the demodulating circuit, for further processing in a sound I.-F. amplifying circuit, an aural signal discriminating circuit, an audio frequency amplifying circuit and a transducer or speaker. The output of the video amplifying circuit is also applied to a synchronizing pulse separating circuit to separate the synchronizing pulses from the image information and the vertical synchronizing pulses from the horizontal. The separated vertical synchronizing pulses are applied to a vertical deflection wave generating circuit and the horizontal synchronizing pulses are applied to a horizontal deflection frequency wave and high voltage generating circuit 48. The vertical deflection generating circuit, the horizontal deflection and high voltage generating circuit are coupled to the kinescope to furnish the necessary vertical and horizontal deflection wave and second anode, or ultor, potentials. An automatic gain control (A.-G.-C.) amplifying and distributing network is coupled to the synchronizing pulse separating circuit, or to the video frequency demodulating circuit, to supply control potential to the desired ones of the circuits previously mentioned. Usually the R.-F. and the I.-F. circuits are at least so supplied.

Now referring specifically to the schematic diagram, sawtooth deflection waves from a horizontal deflection wave oscillator (not shown) are impressed on the control grid of a horizontal output amplifying electron discharge device shown here as a pentode amplifying tube 50. Grid bias is afforded by means of a cathode resistor 52, shunted by a bypass capacitor 54 connected between the cathode and a point of fixed reference potential, shown here as ground. The screen grid 56 is energized by means of a resistor 57 connecting the screen grid to a point of positive operating potential. The screen grid 56 is bypassed to the point of fixed reference potential by means of a capacitor 58. Deflection waves from the output amplifying tube 50 are applied to an output transformer 60 which includes a high voltage winding 62 to a tap of which the anode 59 of the amplifying tube 50 is connected. To the high voltage winding 62 there is connected the more or less conventional high voltage generating circuit comprising a high voltage rectifying device shown here as a high vacuum diode electron discharging device 64 which rectifies high voltage pulses appearing in the step-up portion of the auto transformer winding 62 and a high voltage capacitor 66 which stores the energy in the rectified pulses to provide the ultor of the kinescope with a continuous high voltage through a series resistor 68.

Direct energizing potential is applied to the anode 59 of the amplifying tube 50 through a deflection wave winding 70 by way of a damping device shown here as a high vacuum diode electron discharge tube 74 having a cathode connected to a tapping 72 on the winding 70.

A capacitor 78, serving as the anode voltage boosting, commonly termed "B boost," capacitor is connected between the remaining terminal of the deflection wave winding 70 and the anode of the damping tube 74.

By means of a coupling capacitor 82, a deflection system having two deflection system windings 83, 84 is connected at one terminal near to or at the tapping 72. Capacitors 85—87 and a resistor 88 are employed to provide certain desirable anti-ringing characteristics and, according to the invention, the other terminal of the winding 84 is returned to the point of fixed reference potential or ground by way of a series resistive element 92, whereby the circuit is complete for applying deflection waves to the deflecting windings 83, 84. Further according to the invention, a raster width controlling variable inductor 94 and a resistance device 96 are connected between the terminal of the deflection wave winding 83 and the cathode electrode of the amplifying tube 50.

Electron flow through the amplifying tube 50 passes through the resistance element 96, the variable inductor 94, the deflection system windings 83, 84 and through the resistive element 92 to provide the centering current desired.

The direction of centering current flows through the deflection windings 83, 84 may be reversed if necessary merely by cross-connecting the leads between the resistive and resistance elements 92, 96 and the terminals of the windings 84, 94 as shown by the broken lines. The degree of centering current is determined by the resistance values of the series resistive element 92 and the resistance element 96. These values may be adjusted by using variable resistors but may be set in the design of the receiver under consideration so that the proper centering current is obtained within the tolerances of the kinescopes with which the set is intended to operate.

The sawtooth voltage wave developed across either of the coupling resistors 92, 96 may be used to furnish the reference voltage wave in a sinusoidal automatic synchronizing control circuit, for example of the type described in the text Basic Television by Bernard Grob published in 1949 by the McGraw-Hill Book Company or of the type shown and described in co-pending U. S. patent application Serial No. 338,796, filed February 25, 1953. The resistor used to furnish the reference voltage wave for this purpose should have a value of at least 15 ohms for the circuitry presently in commercial use.

The values of the components listed below, which were used in an application of the invention to a black-andwhite television receiver with satisfactory results, are suggested as examples of circuit components for an initial investigation of practical applications of the invention.

| Ref. No. | Component | Type or value |
|---|---|---|
| 50 | Amplifying tube | 6BQ6. |
| 52 | Cathode resistor | 100 ohms. |
| 54 | Bypass capacitor | 4.0 mf. |
| 57 | Screen resistor | 5,000. |
| 58 | Bypass capacitor | .1 mf. |
| 64 | Rectifying tube | 1B3. |
| 66 | High voltage capacitor | 500 mmf. |
| 68 | Isolating resistor | 500,000. |
| 74 | Damping tube | 6AX4. |
| 78 | B boost capacitor | 0.068 mf. |
| 83, 84 | Deflection windings | 18.5 mh., 30 ohms D.-C. R. |
| 92 | Resistive element | *15 ohms. |
| 94 | Width control | 50-200 mh., 120 ohms D.-C. R. |
| 96 | Resistance control | *15 ohms. |

*The total D.-C. resistance of the deflection windings 83, 84, the width control 94 and the series resistors 92, 96 should be of the order of 150 ohms for developing the proper centering current for the average receiver presently in use. Where no reference voltage is required the proper centering current may be obtained without any series resistance where the total resistance of the other components is of the correct value to draw the proper centering current.

The width of the raster may be controlled by varying the inductance of the width control 94 which is made adjustable for this purpose. Since the total resistance of the circuit will not change when the inductance of the width control 94 is varied, no change in centering is experienced when adjusting the width control 94.

A power supply delivering 260 volts was connected between the point marked with the plus (+) and minus (−) signs. Obviously other values and potentials will be suggested to those skilled in the art for other applications of the invention.

The invention claimed is:

1. A cathode ray beam deflection circuit arrangement comprising a deflection wave translating electron discharge device having cathode and anode electrodes, a cathode impedance device having one terminal connected to said cathode electrode and another terminal, means including an output transformer winding to apply direct energizing potential between said other terminal of said cathode impedance element and the anode electrode of said electron discharge device, a deflection system winding, means connecting said deflection system winding and said cathode impedance element in series for direct current flow, and means for isolating said output transformer winding from said direct current flow in said deflection system winding and for coupling said windings for alternating current flow.

2. A cathode ray beam deflection circuit arrangement comprising a deflection wave translating electron discharge device having cathode and anode electrodes, a cathode impedance device having one terminal connected to said cathode electrode and another terminal, means including an output transformer winding to apply direct energizing potential between said other terminal of said cathode impedance element and the anode electrode of said electron discharge device, a deflection system winding, means including at least one resistive element connecting said deflection system winding and said cathode impedance element in a closed loop for direct current flow, and means isolating said output transformer winding from said direct current flow in said deflection system winding and coupling said windings for alternating current flow.

3. A television receiver deflection circuit arrangement comprising a deflection wave translating electron discharge device having cathode and anode electrodes, a cathode impedance device having one terminal connected to said cathode electrode and another terminal, means including an output transformer winding to apply direct energizing potential between said other terminal of said cathode impedance element and the anode electrode of said electron discharge device, a deflection system winding, means including an adjustable inductance raster width control connecting said deflection system winding and said cathode impedance element in a closed series loop for direct current flow, and means including a capacitive element isolating said output transformer winding from said direct current flow in said deflection system winding and coupling said windings for alternating current flow.

4. A television receiver deflection circuit arrangement comprising a deflection wave translating electron discharge device having cathode and anode electrodes, a cathode impedance device having one terminal connected to said cathode electrode and another terminal, an output transformer winding having one terminal connected to said anode electrode and another terminal, means to apply direct energizing potential between said other terminal of said cathode impedance element and the other terminal of said output transformer winding, a deflection system winding, means including an inductive raster width control and a resistive element connecting said deflection system winding and said cathode impedance element in a closed series loop for direct current flow, and means including a capacitive element connected between said other terminal of said output transformer winding and the junction between said width control and said deflection winding for isolating said output transformer winding from said direct current flow in said deflection system winding and coupling said windings for alternating current flow.

5. A television receiver deflection circuit arrangement comprising a deflection wave translating electron discharge device having cathode and anode electrodes, a cathode impedance device having one terminal connected to said cathode electrode and another terminal, an output transformer winding having one terminal connected to said anode electrode, a tap and another terminal, means including a damping device having one electrode connected to said tap and another electrode to apply direct energizing potential between said other terminal of said cathode impedance element and the other electrode of said damping device, a deflection system winding, means including an inductive raster width control and a resistive element connecting said deflection system winding and said cathode impedance element in a closed series loop for direct current flow, means including a capacitive element connected between said tap and the junction between said width control and said deflection winding for isolating said output transformer winding from said direct current flow in said deflection system winding and coupling said windings for alternating current flow, and a capacitor connected between the other electrode of said damping device and said other terminal of said output transformer winding to boost the potential applied to the anode electrode of said electron discharge device.

References Cited in the file of this patent

UNITED STATES PATENTS

| | | |
|---|---|---|
| 2,382,822 | Schade | Aug. 14, 1945 |
| 2,440,895 | Cawein | May 4, 1948 |
| 2,559,512 | Morgan | July 3, 1951 |
| 2,574,732 | Denton | Nov. 13, 1951 |